United States Patent
Yasui (10) Patent No.: US 12,353,212 B2
(45) Date of Patent: Jul. 8, 2025

(54) CONTROL DEVICE, CONTROL METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 334 days.

(21) Appl. No.: 17/685,429

(22) Filed: Mar. 3, 2022

(65) Prior Publication Data
US 2023/0040374 A1 Feb. 9, 2023

(30) Foreign Application Priority Data
Mar. 16, 2021 (JP) ................... 2021-042627

(51) Int. Cl.
G05D 1/00 (2024.01)
G06T 7/20 (2017.01)

(52) U.S. Cl.
CPC ......... *G05D 1/0214* (2013.01); *G05D 1/0231* (2013.01); *G06T 7/20* (2013.01); *G06T 2207/30196* (2013.01); *G06T 2207/30241* (2013.01)

(58) Field of Classification Search
CPC .. G05D 1/0214; G05D 1/0231; G05D 1/0253; G06T 7/20; G06T 2207/30196;
(Continued)

(56) References Cited

U.S. PATENT DOCUMENTS 10,007,269 B1 6/2018 Gray
2004/0016077 A1* 1/2004 Song ................... G05D 1/0246
15/340.1
(Continued)

FOREIGN PATENT DOCUMENTS

CN 105787471 7/2016
CN 107092252 8/2017
(Continued)

OTHER PUBLICATIONS

Japanese Office Action for Japanese Patent Application No. 2021-042627 dated Jul. 2, 2024.
(Continued)

*Primary Examiner* — Jelani A Smith
*Assistant Examiner* — Toya Pettiegrew
(74) *Attorney, Agent, or Firm* — Amin, Turocy & Watson, LLP (57) ABSTRACT

A control device includes a storage device which has stored a program, and a hardware processor, in which the hardware processor executes the program stored in the storage device, thereby acquiring a peripheral image of the mobile object, which is an image captured by a fisheye camera mounted on a mobile object, calculating an instruction regarding future traveling of the mobile object as a base trajectory in an orthogonal coordinate system, coordinate-converting the acquired base trajectory in the orthogonal coordinate system into a base trajectory in a fisheye camera coordinate system, calculating a risk of the base trajectory in the fisheye camera coordinate system on the basis of the peripheral image, and the base trajectory in the fisheye camera coordinate system, and calculating a traveling trajectory by modifying the base trajectory in the orthogonal coordinate system on the basis of the risk of the base trajectory in the fisheye camera coordinate system.

6 Claims, 8 Drawing Sheets

(58) Field of Classification Search
CPC .......... G06T 2207/30241; G06T 3/047; G06V 40/20
See application file for complete search history.

(56) References Cited

U.S. PATENT DOCUMENTS

| | | | |
|---|---|---|---|
| 2010/0222925 A1* | 9/2010 | Anezaki | G05D 1/0221 |
| | | | 700/253 |
| 2011/0158476 A1 | 6/2011 | Fahn et al. | |
| 2016/0364004 A1 | 12/2016 | Ekandem et al. | |
| 2017/0075348 A1 | 3/2017 | Kratz et al. | |
| 2019/0004535 A1 | 1/2019 | Huang et al. | |
| 2019/0011911 A1 | 1/2019 | Kubo et al. | |
| 2019/0041513 A1 | 2/2019 | Chen | |
| 2019/0329766 A1 | 10/2019 | Ishioka | |
| 2020/0101599 A1* | 4/2020 | Yoshida | B25J 9/1697 |
| 2020/0333789 A1* | 10/2020 | Suzuki | G05D 1/0212 |
| 2022/0066456 A1* | 3/2022 | Ebrahimi Afrouzi | |
| | | | G06F 3/04883 |
| 2022/0284627 A1* | 9/2022 | Johnson | H04N 17/002 |

FOREIGN PATENT DOCUMENTS

| | | |
|---|---|---|
| CN | 109215337 | 1/2019 |
| CN | 110121449 | 8/2019 |
| CN | 112130576 | 12/2020 |
| JP | 2004-303137 | 10/2004 |
| JP | 2006-051550 | 2/2006 |
| JP | 2006-185438 | 7/2006 |
| JP | 2017-054475 | 3/2017 |
| JP | 2018-522306 | 8/2018 |
| JP | 2019-008796 | 1/2019 |
| JP | 2019-028967 | 2/2019 |
| JP | 2020-112952 | 7/2020 |
| TW | 201123031 | 7/2011 |

OTHER PUBLICATIONS

Chinese Office Action for Chinese Patent Application No. 202210183740.8 mailed Mar. 14, 2025.

* cited by examiner

CONTROL DEVICE, CONTROL METHOD, AND STORAGE MEDIUM

CROSS-REFERENCE TO RELATED APPLICATION

Priority is claimed on Japanese Patent Application No. 2021-042627, filed on Mar. 16, 2021, the contents of which are incorporated herein by reference.

BACKGROUND

Field of the Invention

The present invention relates to a control device, a control method, and a storage medium.

Description of Related Art

A technology of mounting a fisheye camera on a robot that can move autonomously is known. For example, Japanese Unexamined Patent Application, First Publication No. 2004-303137 discloses a technology in which a fisheye camera is mounted on a robot that can move autonomously, and a traveling trajectory of the robot is calculated based on an image captured by the fisheye camera.

SUMMARY

In the technology described in Japanese Unexamined Patent Application, First Publication No. 2004-303137, a marker for indicating a location is installed at a specific position, and a robot is caused to travel using a relative distance and a relative direction between the marker and the robot. However, it takes time and effort to install a marker for traveling of the robot.

Furthermore, the conventional technologies coordinate-convert all points of an image captured by a fisheye camera from a fisheye camera coordinate system to an orthogonal coordinate system, evaluate a risk of a traveling trajectory on the basis of the converted coordinates, and modify the traveling trajectory, and thus it is assumed that a processing load of performing coordinate conversion from the fisheye camera coordinate system to the orthogonal coordinate system is large.

The present invention is made in view of such circumstances, and an object thereof is to provide a control device, a control method, and a storage medium that can appropriately evaluate a risk of a traveling trajectory while reducing a processing load.

A control device, a control method, and a storage medium according to the present invention have adopted the following configurations.

(1): A control device according to one aspect of the present invention includes a storage device which has stored a program, and a hardware processor, in which the hardware processor executes the program stored in the storage device, thereby acquiring a peripheral image of the mobile object, which is an image captured by a fisheye camera mounted on a mobile object, calculating an instruction regarding future traveling of the mobile object as a base trajectory in an orthogonal coordinate system, coordinate-converting the acquired base trajectory in the orthogonal coordinate system into a base trajectory in a fisheye camera coordinate system, calculating a risk of the base trajectory in the fisheye camera coordinate system on the basis of the peripheral image, and the base trajectory in the fisheye camera coordinate system, and calculating a traveling trajectory by modifying the base trajectory in the orthogonal coordinate system on the basis of the risk of the base trajectory in the fisheye camera coordinate system.

(2): In the aspect of (1) described above, the hardware processor coordinate-converts a traveling trajectory in the orthogonal coordinate system into a traveling trajectory in the fisheye camera coordinate system, the hardware processor calculates a risk of the traveling trajectory in the fisheye camera coordinate system on the basis of the peripheral image and the traveling trajectory in the fisheye camera coordinate system, and the hardware processor calculates the traveling trajectory again by modifying the traveling trajectory in the orthogonal coordinate system on the basis of the risk of the traveling trajectory in the fisheye camera coordinate system.

(3): In the aspect of (1) described above, the hardware processor causes the mobile object to travel along the base trajectory or the traveling trajectory, and the hardware processor causes the mobile object to travel along the base trajectory or the traveling trajectory when it is determined that the risk of the base trajectory or the traveling trajectory is equal to or less than a threshold value.

(4): In the aspect of (1) described above, the hardware processor detects a body motion that indicates an instruction regarding future traveling of the mobile object by a user, and the hardware processor calculates a base trajectory in the orthogonal coordinate system on the basis of a detected body motion.

(5): A control method to be executed by a computer mounted on a mobile object according to another aspect of the present invention includes acquiring a peripheral image of the mobile object, which is an image captured by a fisheye camera mounted on the mobile object, acquiring an instruction regarding future traveling of the mobile object as a base trajectory in an orthogonal coordinate system, coordinate-converting the acquired base trajectory in the orthogonal coordinate system into a base trajectory in a fisheye camera coordinate system, calculating a risk of the base trajectory of the fisheye camera coordinate system on the basis of the peripheral image and the base trajectory in the fisheye camera coordinate system, and calculating a traveling trajectory by modifying the base trajectory in the orthogonal coordinate system on the basis of the risk of the base trajectory in the fisheye camera coordinate system.

(6): A computer-readable non-transitory storage medium according to still another aspect of the present invention has stored a program for causing a computer mounted on a mobile object to execute acquiring a peripheral image of the mobile object, which is an image captured by a fisheye camera mounted on the mobile object, acquiring an instruction regarding future traveling of the mobile object as a base trajectory in an orthogonal coordinate system, coordinate-converting the acquired base trajectory in the orthogonal coordinate system into a base trajectory in a fisheye camera coordinate system, calculating a risk of the base trajectory of the fisheye camera coordinate system on the basis of the peripheral image and the base trajectory in the fisheye camera coordinate system, and calculating a traveling trajectory by modifying the base trajectory in the orthogonal coordinate system on the basis of the risk of the base trajectory in the fisheye camera coordinate system.

According to the aspects of (1) to (6), it is possible to appropriately evaluate a risk of a traveling trajectory while reducing a processing load.

DESCRIPTION OF EMBODIMENTS

Embodiment

Hereinafter, a control device, a control method, and a storage medium according to an embodiment of the present invention will be described with reference to the drawings.
[Overall Configuration]

Figure 1:
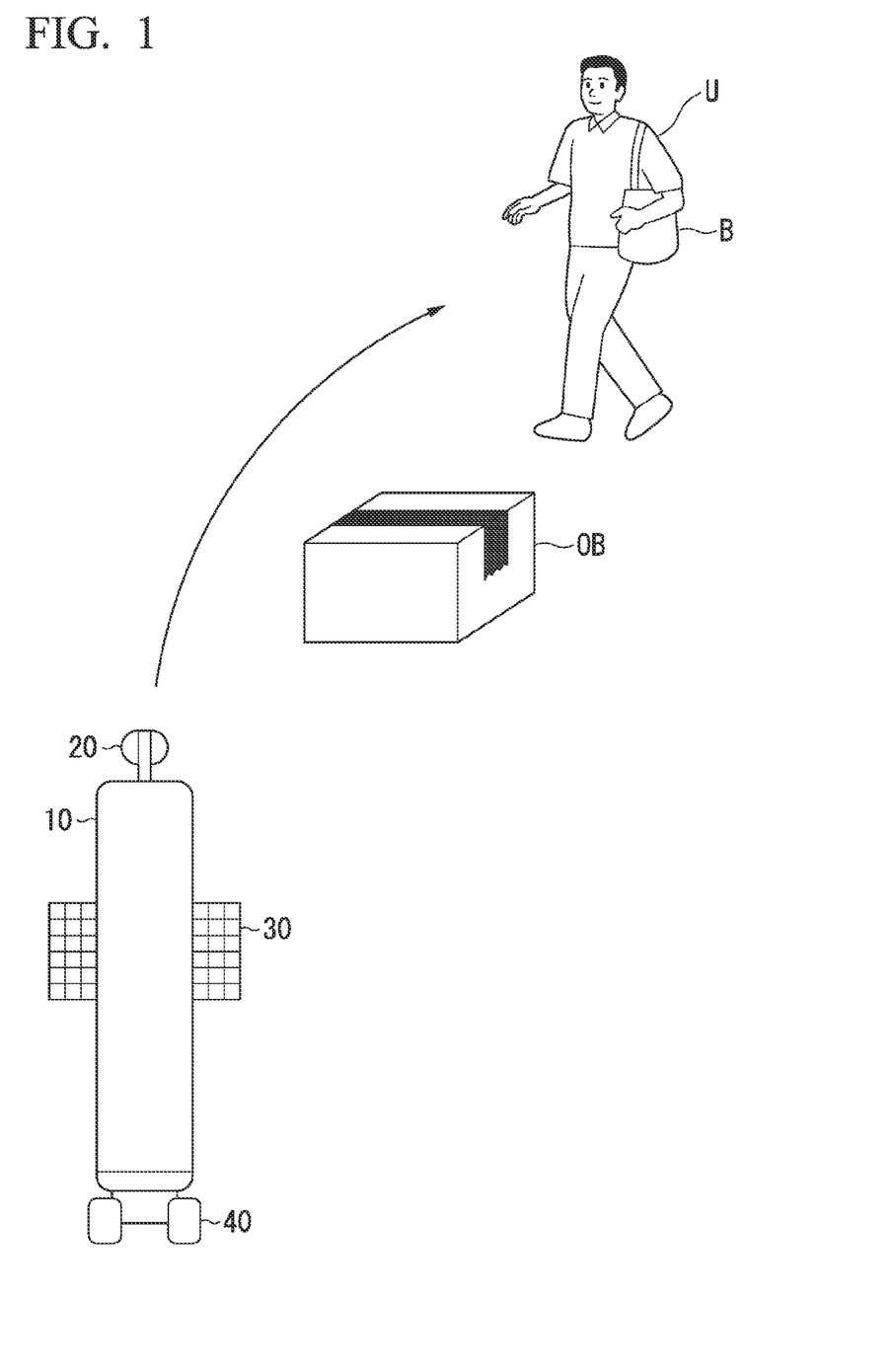
FIG. 1 is a diagram which shows an example of a situation in which a mobile object including a control device according to an embodiment is used.

FIG. 1 is a diagram which shows an example of a situation in which a mobile object 10 including a control device according to an embodiment is used. The mobile object 10 is an autonomous mobile robot, and includes a fisheye camera 20, a container 30, and a vehicle wheel 40. Modes of use of the mobile object 10 include the following modes. A user U holds a luggage B, and the mobile object 10 moves in a direction of the user U to accommodate the luggage B according to a gesture of the user. Since an obstacle OB is present between the mobile object 10 and the user U, the mobile object 10 autonomously avoids the obstacle OB and moves to a vicinity of the user U. After the user U puts the luggage B on the container 30, the mobile object 10 moves along with the user U.

The fisheye camera 20 is a camera that includes, for example, a fisheye lens and can capture an image of a periphery of the mobile object 10 at a wide angle (for example, at 360 degrees). The fisheye camera 20 is attached to, for example, an upper part of the mobile object 10 to capture the image of the periphery of the mobile object 10 at a wide angle in a horizontal direction. The fisheye camera 20 may be realized by combining a plurality of 120-degree cameras or 60-degree cameras.

The container 30 is a container for accommodating arbitrary goods and luggage, and is fixed to a body of the mobile object 10.

The vehicle wheel 40 is driven by a plurality of motors 50 mounted in the mobile object 10, and realizes a movement by the mobile object 10. The vehicle wheel 40 includes, for example, a drive wheel driven in a rotational direction by the motor 50 and a steering wheel which is a non-drive wheel driven in a yaw direction. By adjusting an angle of the steering wheel, the mobile object 10 can change a route.

In the present invention, it is not essential that the mobile object 10 includes the container 30. Furthermore, in the present embodiment, the mobile object 10 includes the vehicle wheel 40 as a mechanism for realizing the movement, but the present invention is not limited to this configuration. For example, the mobile object 10 is a multi-legged walking robot.

Figure 2:
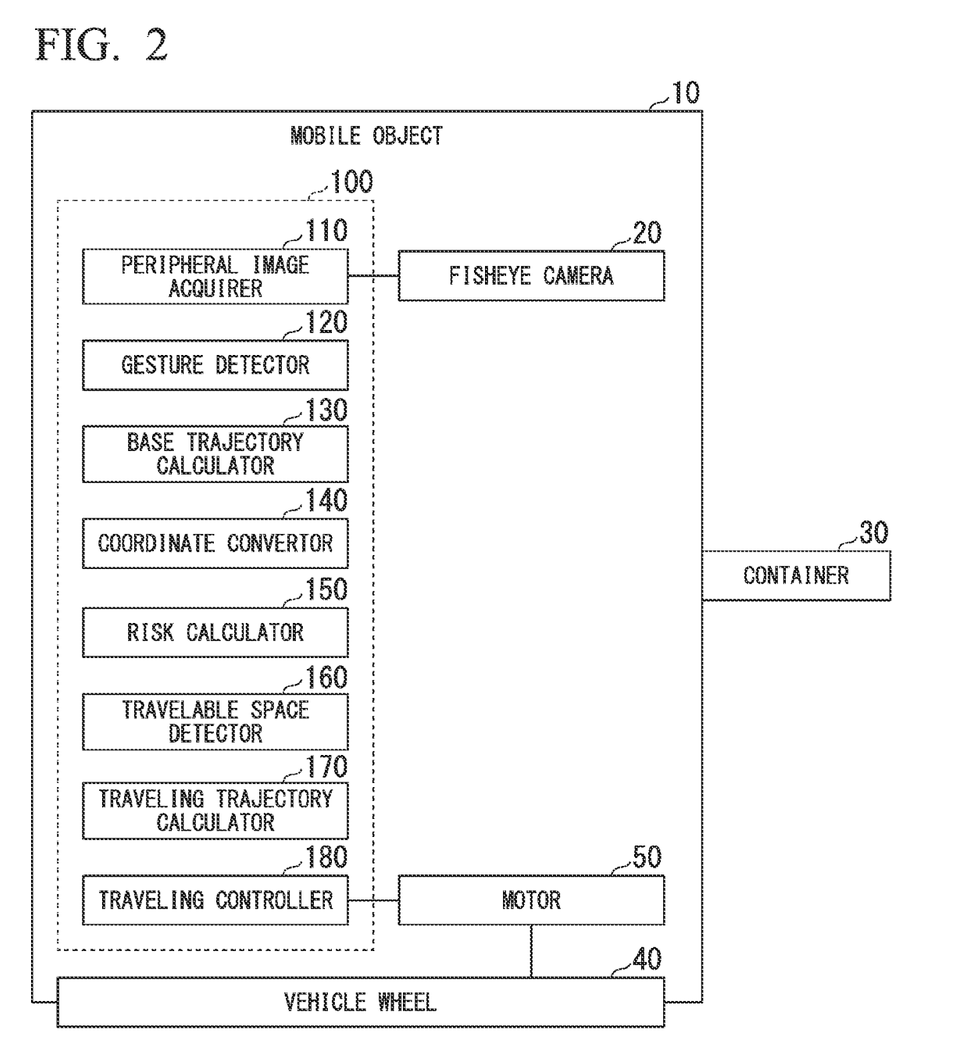
FIG. 2 is a diagram for describing an example of an overall configuration of the mobile object.

FIG. 2 is a diagram for describing an example of the overall configuration of the mobile object 10. The mobile object 10 includes a control device 100 in addition to the fisheye camera 20, the container 30, the vehicle wheel 40, and the motor 50 described above. The control device 100 includes, for example, a peripheral image acquirer 110, a gesture detector 120, a base trajectory calculator 130, a coordinate convertor 140, a risk calculator 150, a travelable space detector 160, a traveling trajectory calculator 170, and a traveling controller 180. Each part of the control device 100 is realized by, for example, a hardware processor such as a central processing unit (CPU) executing a program (software). Some or all of respective parts of the control device 100 may be realized by hardware (a circuit unit; including circuitry) such as large scale integration (LSI), an application specific integrated circuit (ASIC), a field-programmable gate array (FPGA), a graphics processing unit (GPU), or may also be realized by software and hardware in cooperation. A program may be stored in advance in a storage device (a storage device including a non-transitory storage medium) such as a hard disk drive (HDD) or a flash memory, or may be stored in a removable storage medium (a non-transitory storage medium) such as a DVD or a CD-ROM and may be installed by the storage medium being mounting on a drive device.

The peripheral image acquirer 110 acquires an image (hereinafter referred to as a "peripheral image") captured by the fisheye camera 20. Since the peripheral image acquired at this time is a 360-degree image, the peripheral image acquirer 110 holds the acquired peripheral image as pixel data in a fisheye camera coordinate system.

The gesture detector 120 detects a body motion (hereinafter referred to as a "gesture") by the user U on the basis of one or more peripheral images. In the present embodiment, a gesture is set in advance to indicate an instruction regarding a future traveling of the mobile object 10. The gesture detector 120 stores data (template data) regarding a plurality of gestures in advance, and detects a gesture in a peripheral image by matching feature data acquired from the peripheral image with the template data.

Each of the feature data and the template data is, for example, an expression of feature points of a skeleton such as fingertips of a person, finger joints, wrists, and elbows, and links connecting them using abstract data.

Figure 3:
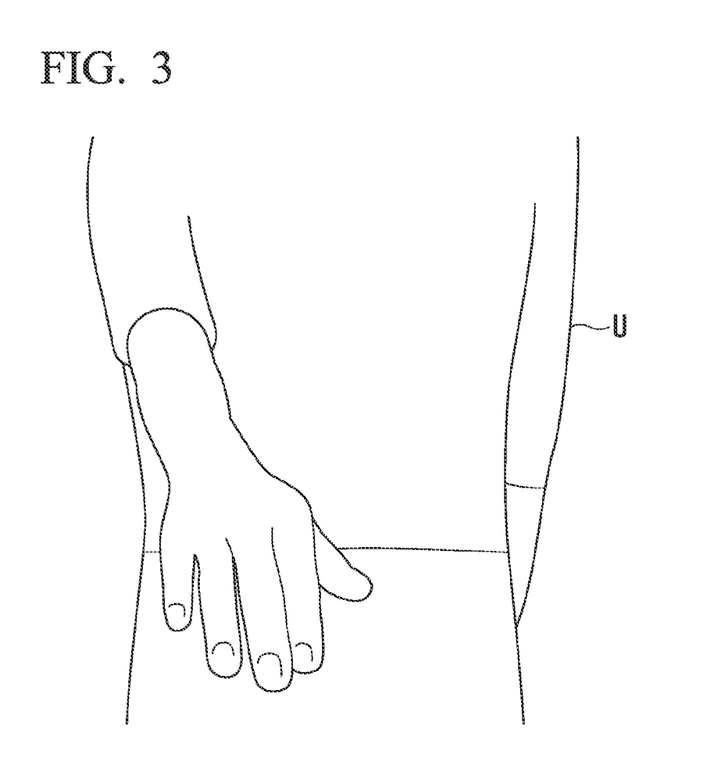
FIG. 3 is a diagram which shows an example of a gesture shown by a user.

FIG. 3 is a diagram which shows an example of a gesture shown by the user U. In FIG. 3, the user U extends the right hand forward. In the present embodiment, a gesture of extending the right hand forward has a meaning of "please move forward toward the user U." In addition to this, the gesture detector 120 is assumed to detect various gestures having meanings such as rotation, stop, and retreat, but details thereof will be omitted.

In the present embodiment, it is assumed that the mobile object 10 has the gesture detector 120 that detects the gesture of the user U, but another constituent may also be used as long as it can recognize the instruction regarding the future traveling of the mobile object 10. For example, the mobile object 10 may include a voice recognizer that recognizes a voice emitted by the user U, and recognize an instruction regarding the future traveling of the mobile object 10 by recognizing that the user U transmits (for example, "comes" or the like) the instruction by using his voice. Furthermore, as another example, the user U may transmit information indicating the instruction regarding the future traveling of the mobile object 10 to the mobile object 10 from an information processing terminal such as a smartphone owned by the user U by using a dedicated application, and the mobile object 10 may recognize the instruction by receiving the information.

The base trajectory calculator 130 calculates a base trajectory BL, which is initial information of a trajectory that the mobile object 10 needs to travel in the future, on the basis of a gesture detected by the gesture detector 120. At this time, the base trajectory calculator 130 calculates the base trajectory BL in the orthogonal coordinate system. The orthogonal coordinate system is a coordinate system whose origin is a position of the mobile object 10, which is fixedly set on a body of the mobile object 10, and whose axes are arbitrary directions orthogonal to each other. For example, when the user U shows a gesture of extending the right hand forward, the base trajectory calculator 130 calculates a base trajectory BL-1 whose start point is the position of the mobile object 10, initial movement vector matches a direction of the mobile object 10, and end point is the position of the user U immediately before. The base trajectory BL-1 may also be calculated such that a front surface of the mobile object 10 (a surface on a side where the container 30 is located) faces the user U at the position of the user U immediately before. The base trajectory BL-1 is calculated by, for example, fitting the state to a geometric model such as a Bezier curve. The base trajectory is, for example, calculated without considering a presence of the obstacle OB. The base trajectory BL is actually generated as a collection of a finite number of trajectory points.

The coordinate convertor 140 performs coordinate conversion between the orthogonal coordinate system and the fisheye camera coordinate system. A one-to-one relationship is established between coordinates in the orthogonal coordinate system and the fisheye camera coordinate system, and the relationship is held by the coordinate convertor 140 as correspondence information. In the following description, information in the orthogonal coordinate system is represented by a code "-1," and information in the fisheye camera coordinate system is represented by a code "-2." When the two are not distinguished, "-1" and "-2" will be omitted. The coordinate convertor 140 coordinate-converts the base trajectory BL-1 in the orthogonal coordinate system, calculated by the base trajectory calculator 130, into a base trajectory BL-2 in the fisheye camera coordinate system. Furthermore, as described below, the coordinate convertor 140 converts a traveling trajectory TL-1 in the orthogonal coordinate system, calculated by the traveling trajectory calculator 170, into a traveling trajectory TL-2 in the fisheye camera coordinate system.

Here, a traveling trajectory TL is a trajectory obtained by modifying the base trajectory BL, and is calculated, as described below, for example, when it is determined that the risk for traveling on the base trajectory BL is high due to the presence of an obstacle OB.

Figure 4:
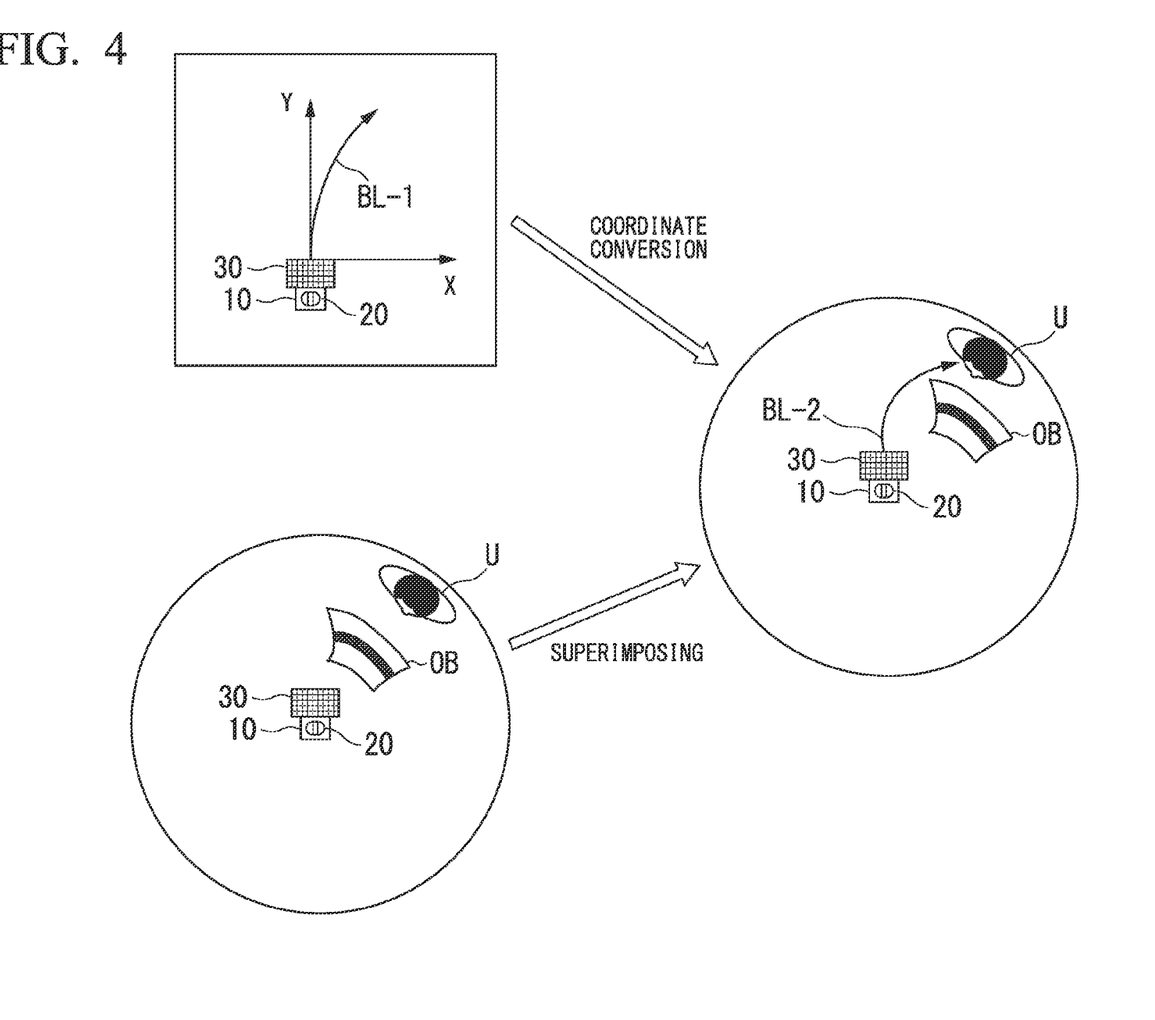
FIG. 4 is a diagram which shows an example of coordinate conversion of a base trajectory executed by a coordinate convertor.

FIG. 4 is a diagram which shows an example of coordinate conversion of the base trajectory BL executed by the coordinate convertor 140. An upper left part of FIG. 4 shows the base trajectory BL-1 calculated by the base trajectory calculator 130, and a lower left part of FIG. 4 shows a peripheral image of the mobile object 10 acquired by the peripheral image acquirer 110. The coordinate convertor 140 can acquire the base trajectory BL-2 in the fisheye camera coordinate system by coordinate-converting the base trajectory BL-1 into that in the fisheye camera coordinate system, and calculate the risk by superimposing the base trajectory BL-2 on the peripheral image.

The risk calculator 150 calculates the risk of each coordinate in the fisheye camera coordinate system and obtains a distribution of the risk in a target area in the fisheye camera coordinate system. The risk is an index value indicating a level of possibility of the mobile object 10 colliding with other obstacles. The risk calculator 150 uses the risk distribution (a risk function) to calculate the risk of the base trajectory BL-2 or traveling trajectory TL-2. For example, the risk calculator 150 calculates a risk Ji at each trajectory point on the base trajectory BL or the traveling trajectory TL of the mobile object 10, and obtains a sum $\Sigma Ji$ of the risk Ji to calculate a risk J of the base trajectory BL-2 or the traveling trajectory TL-2. That is, $J=\Sigma Ji$ is established.

The risk at a certain trajectory point on the base trajectory BL-2 or traveling trajectory TL-2 can be calculated on the basis of a distance between the trajectory point and an obstacle and a speed of the obstacle. For example, the risk calculator 150 calculates the risk at each trajectory point on the base trajectory BL-2 or the traveling trajectory TL-2 to be higher as a distance between the trajectory point and an obstacle is shorter, and the risk at a trajectory point on the base trajectory BL-2 or the traveling trajectory TL-2 to be lower as the distance between the trajectory point and an obstacle is longer. More specifically, the risk calculator 150 sets the risk in an area of a minimum circumscribed circle containing the obstacle OB to a predetermined value (for example, 1), and calculates the risk Ji such that it becomes smaller as a distance from the area increases and becomes zero at a certain point. Furthermore, since the risk of the moving obstacle OB will be different at each point in the future, risk distribution data will be prepared for each time at which the mobile object 10 arrives in the traveling trajectory TL.

Figure 5:
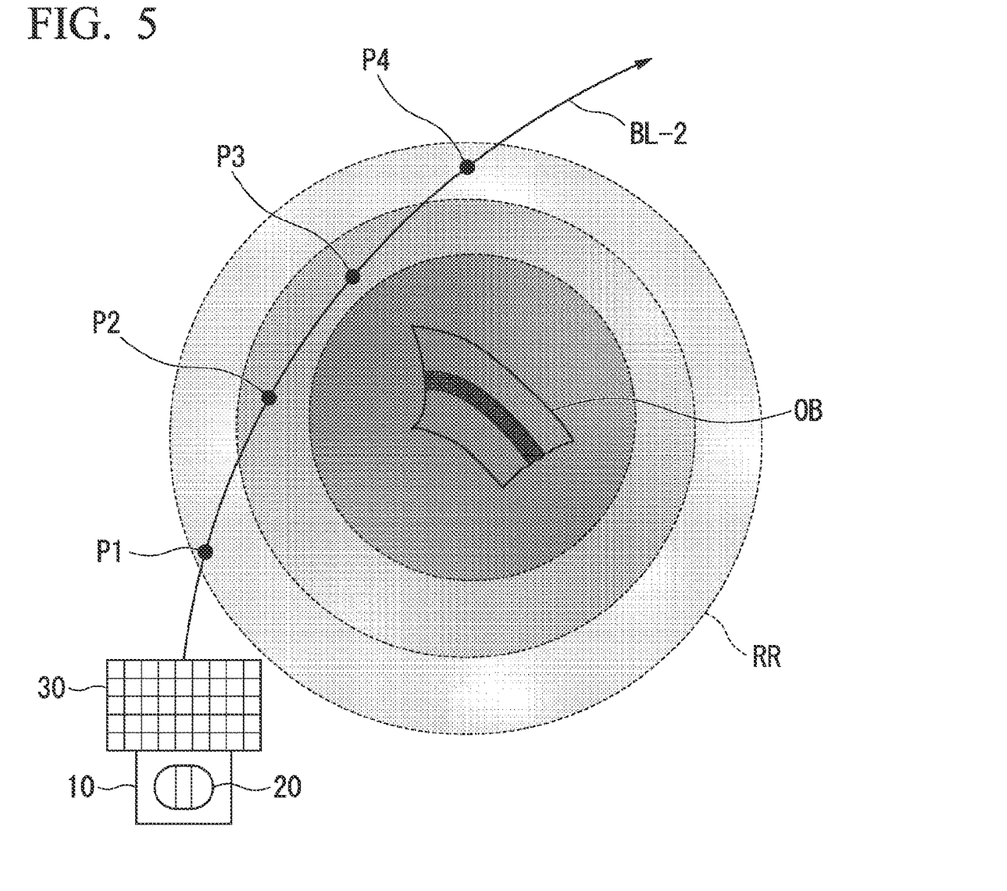
FIG. 5 is a diagram which shows an example of a situation in which a risk calculator calculates a risk of a base trajectory in a fisheye camera coordinate system.

FIG. 5 is a diagram which shows an example of a situation in which the risk calculator 150 calculates the risk of the base trajectory BL-2 in the fisheye camera coordinate system. FIG. 5 is a calculation of the risk of the base trajectory BL-2 in the fisheye camera coordinate system, acquired by the coordinate convertor 140 in FIG. 4, by the risk calculator 150. In FIG. 5, a hatch area RR represents a risk area where risk is positive. In FIGS. 5, P1 to P4 are trajectory points constituting the base trajectory BL-2. The risk calculator 150 substitutes positions of these trajectory points P1 to P4 into the risk function for calculating the risk of each trajectory point, and calculates risk values $J_{P1}$, $J_{P2}$, $J_{P3}$, and $J_{P4}$ at each trajectory point. Next, the risk calculator 150 takes the sum of the risk values at each trajectory point and calculates the risk $\Sigma J = J_{P1} + J_{P2} + J_{P3} + J_{P4}$ of the base trajectory BL. As a result, the risk calculator 150 can calculate the risk of the base trajectory BL-2. The same applies to a method in which the risk calculator 150 calculates the risk of the traveling trajectory TL-2.

When the risk calculator 150 calculates the risk $\Sigma J$ of the base trajectory BL-2 in the fisheye camera coordinate system, it next compares the calculated risk $\Sigma J$ with a threshold value Th (for example, 1), and determines whether to cause the mobile object 10 to travel along the base trajectory BL. When the risk calculator 150 determines that the risk $\Sigma J$ is within the threshold value Th, it determines to cause the mobile object 10 to travel along the base trajectory BL. On the other hand, when the risk calculator 150 determines that the risk ΣJ is larger than the threshold value Th, it determines not to cause the mobile object 10 to travel along the base trajectory BL.

In the present embodiment, the risk calculator 150 compares the risk ΣJ with the threshold value Th. However, the method of comparing the risk ΣJ and the threshold value Th is not limited to this configuration. For example, in FIG. 5, the risk calculator 150 may extract a maximum value of the risk values $J_{P1}$, $J_{P2}$, $J_{P3}$, and $J_{P4}$ on the base trajectory BL-2 ($J_{P3}$ in the case of FIG. 5), and compare the maximum value and the threshold value Th. The method of comparing the risk ΣJ and the threshold value Th is advantageous in that the mobile object 10 can be caused to travel more safely, and the method of comparing the maximum value and the threshold value Th is advantageous in that the mobile object 10 can be caused to travel more efficiently.

The travelable space detector 160 detects a travelable space FS-2 that is a space in which the mobile object 10 can travel in the fisheye camera coordinate system on the basis of the peripheral image when the risk calculator 150 determines not to cause the mobile object 10 to travel along the base trajectory BL.

Figure 6:
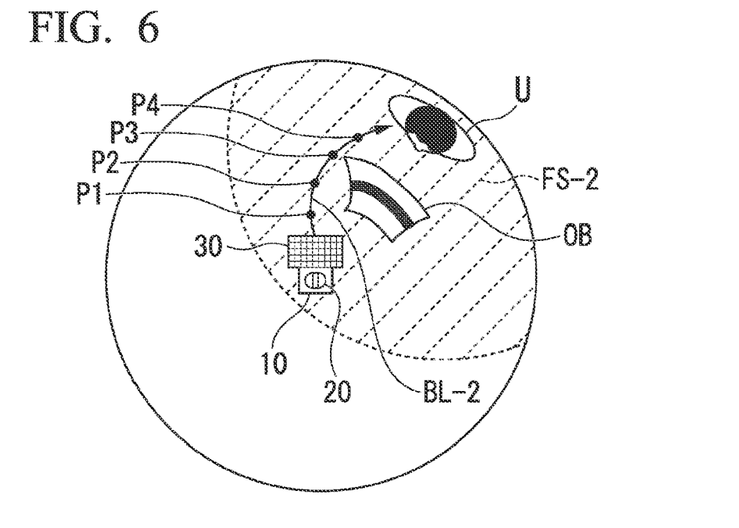
FIG. 6 is a diagram which shows an example of detection processing of a travelable space by a travelable space detector.

FIG. 6 is a diagram which shows an example of the processing of detecting a travelable space FS by the travelable space detector 160. As shown in FIG. 6, since the risk calculator 150 determines not to cause the mobile object 10 to travel along the base trajectory BL, the travelable space detector 160 detects a space indicated by a shaded area, that is, a space extending from a start point of the base trajectory BL-2 (the position of the mobile object 10) to an end point (the position of the user U immediately before) and excluding obstacles (the obstacle OB and the user U) as a travelable space FS-2.

The traveling trajectory calculator 170 calculates a modification amount of each trajectory point that is within a range of the travelable space FS-2 detected by the travelable space detector 160 on the basis of the risk of each trajectory point calculated by the risk calculator 150 as a modification amount in the orthogonal coordinate system. Here, the modification amount of each trajectory point in the orthogonal coordinate system is calculated by increasing a modification width Δ in a direction orthogonal to a tangent of a corresponding trajectory point as the risk value Ji at the corresponding trajectory point in the fisheye camera coordinate system increases. That is, the traveling trajectory calculator 170 obtains the traveling trajectory TL-1 by changing a trajectory point of the base trajectory BL-1 by the modification width Δ corresponding to each risk value Ji. In this manner, the traveling trajectory calculator 170 calculates the modification amount of a corresponding trajectory point in the orthogonal coordinate system on the basis of the risk of each trajectory point in the fisheye camera coordinate system without coordinate-converting an image captured by the fisheye camera 20 into that in the orthogonal coordinate system, and thus it can reduce an amount of calculation required for modifying a trajectory.

Figure 7:
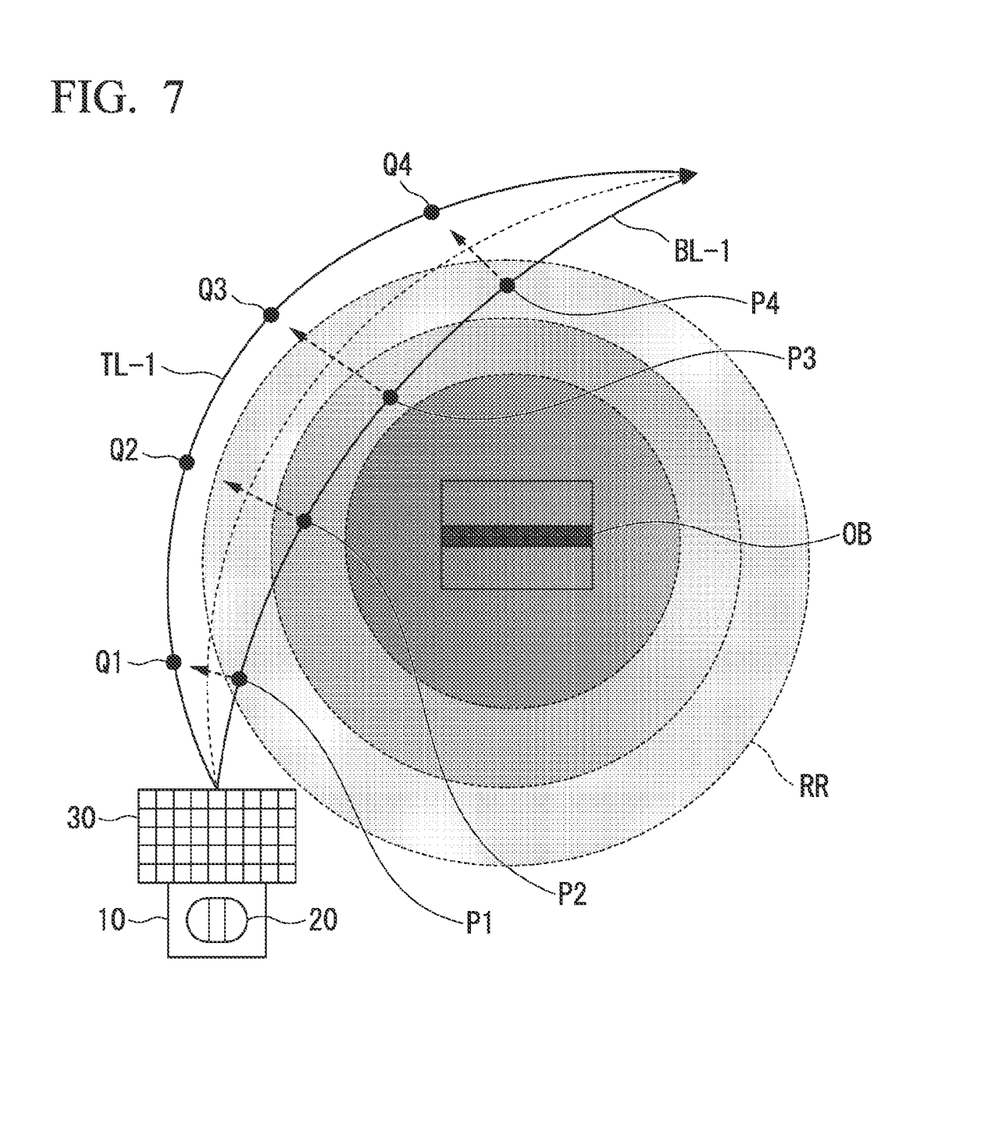
FIG. 7 is a diagram which shows an example of a situation in which a traveling trajectory calculator calculates a traveling trajectory in an orthogonal coordinate system.

FIG. 7 is a diagram which shows an example of a situation in which the traveling trajectory calculator 170 calculates the traveling trajectory TL-1 in the orthogonal coordinate system. In FIG. 7, trajectory points Q1, Q2, Q3, and Q4 are trajectory points obtained by changing each of the trajectory points P1, P2, P3, and P4 of the base trajectory BL-1 by a trajectory modification parameter Δ corresponding to each risk value Ji. In FIG. 7, since the risk values Ji of the trajectory points P1, P2, P3, and P4 increase in order of $J_{P3}$, $J_{P2}$, $J_{P4}$, and $J_{P1}$, the modification width Δ in the direction orthogonal to the tangent of each trajectory point also increases in order of P3, P2, P4, and P1.

Next, the coordinate convertor 140 converts the traveling trajectory TL-1 in the orthogonal coordinate system into the traveling trajectory TL-2 in the fisheye camera coordinate system, and the risk calculator 150 substitutes positions of the trajectory points Q1 to Q4 on the traveling trajectory TL-2 into the risk function to calculate risk values $J_{Q1}$, $J_{Q2}$, $J_{Q3}$, and $J_{Q4}$ at each trajectory point. A risk distribution (the risk function) used for the calculation at this time is the same as that used when the risk of the base trajectory BL-2 is obtained. Next, the risk calculator 150 takes the sum of the risk values at each trajectory point and calculates a risk $\Sigma J = J_{Q1} + J_{Q2} + J_{Q3} + J_{Q4}$ of the traveling trajectory TL-1. In the case of FIG. 7, since the trajectory points Q1 to Q4 are outside the risk area RR of the obstacle OB, the risk calculator 150 obtains $\Sigma J = J_{Q1} + J_{Q2} + J_{Q3} + J_{Q4} = 0$.

When the risk calculator 150 calculates the risk ΣJ of the traveling trajectory TL-1 in the fisheye camera coordinate system, it next compares the calculated risk ΣJ with the threshold value Th, and determines whether to cause the mobile object 10 to travel along the traveling trajectory TL. When the risk calculator 150 determines that the risk ΣJ is within the threshold value Th, it determines to cause the mobile object 10 to travel along the traveling trajectory TL. On the other hand, when the risk calculator 150 determines that the risk ΣJ is larger than the threshold value Th, it determines not to cause the mobile object 10 to travel along the traveling trajectory TL and repeats the same modification until the risk ΣJ becomes equal to or smaller than the threshold value Th to calculate the traveling trajectory TL again. In the case of FIG. 7, since the risk ΣJ=0 and is smaller than the threshold value Th, the risk calculator 150 determines to cause the mobile object 10 to travel along the traveling trajectory TL.

In the description above, it is assumed that the modification width Δ of a trajectory point is a value corresponding to each risk value Ji, but, at this time, the traveling trajectory calculator 170 may multiply the trajectory modification parameter Δ by a random number to prevent the traveling trajectory TL-1 from taking a local solution of the sum of the risk values ΣJ.

Figure 8:
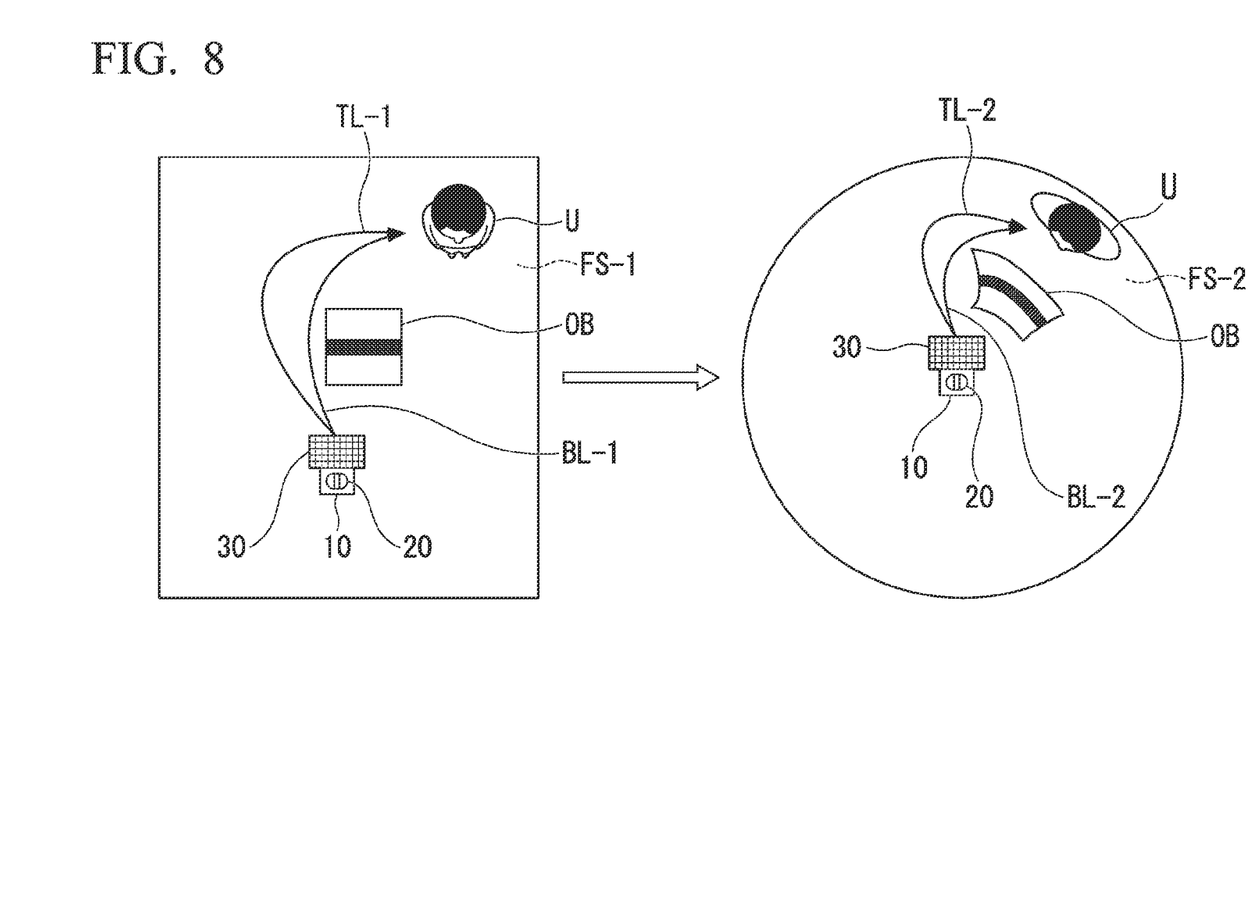
FIG. 8 is a diagram which shows an example of calculation processing of a traveling trajectory by a traveling trajectory calculator and coordinate conversion of a traveling trajectory by a coordinate convertor.

FIG. 8 is a diagram which shows an example of the calculation processing of the traveling trajectory TL by the traveling trajectory calculator 170 and the coordinate conversion of the traveling trajectory TL by the coordinate convertor 140. As described above, the traveling trajectory calculator 170 calculates the traveling trajectory TL-1 by changing a corresponding trajectory point of the base trajectory BL-1 using the modification amount in the orthogonal coordinate system, which is calculated on the basis of a risk of each trajectory point in the fisheye camera coordinate system, by only the trajectory modification parameter Δ. Next, the coordinate convertor 140 coordinate-converts the traveling trajectory TL-1 in the orthogonal coordinate system into the traveling trajectory TL-2 in the fisheye camera coordinate system, and the risk calculator 150 calculates the risk of the traveling trajectory TL-2 on the basis of the peripheral image and the traveling trajectory TL-2 in the fisheye camera coordinate system. In this manner, it is possible to appropriately evaluate the risk of a traveling trajectory while reducing a processing load required for the modification by calculating the modification amount of a corresponding trajectory point in the orthogonal coordinate system on the basis of the risk of each trajectory point in the fisheye camera coordinate system.

When the risk calculator 150 determines that the risk value of the base trajectory BL or the traveling trajectory TL is equal to or smaller than the threshold value Th, the traveling controller 180 causes the mobile object 10 to travel along the base trajectory BL or the traveling trajectory TL. Specifically, the traveling controller 180 outputs a command value indicating that the mobile object 10 travels along the base trajectory BL or the traveling trajectory TL to the motor 50, and the motor 50 causes the vehicle wheel 40 to rotate according to the command value.

[Processing Flow]

Figure 9:
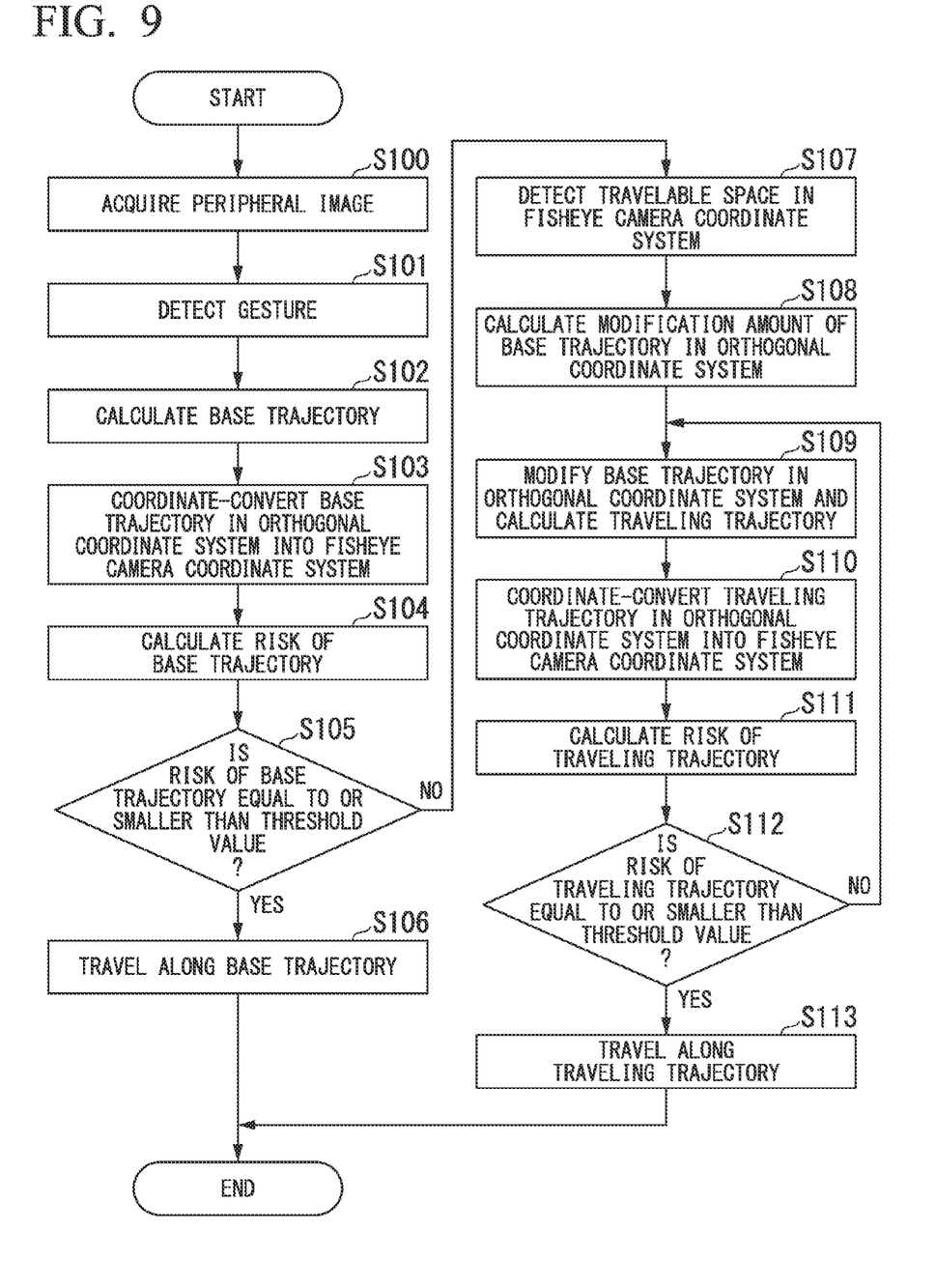
FIG. 9 is a flowchart which shows an example of a flow of processing executed by a control device.

Next, a flow of processing by the control device 100 according to the present embodiment will be described with reference to FIG. 9. FIG. 9 is a flowchart which shows an example of the flow of processing executed by the control device 100. Processing of this flowchart will be executed every predetermined control cycle.

First, the peripheral image acquirer 110 acquires a peripheral image of the mobile object 10 captured by the fisheye camera 20 (step S100). Next, the gesture detector 120 detects a gesture indicating an instruction regarding future traveling of the mobile object 10 on the basis of the peripheral image acquired by the peripheral image acquirer 110 (step S101). Next, the base trajectory calculator 130 calculates a base trajectory BL-1 in the orthogonal coordinate system on the basis of the gesture detected by the gesture detector 120 (step S102). Next, the coordinate convertor 140 coordinate-converts the base trajectory BL-1 in the orthogonal coordinate system calculated by the base trajectory calculator 130 into a base trajectory BL-2 in the fisheye camera coordinate system (step S103). Next, the risk calculator 150 calculates a risk of the base trajectory BL-2 in the fisheye camera coordinate system on the basis of the peripheral image and the base trajectory BL-2 in the fisheye camera coordinate system (step S104).

Next, the risk calculator 150 determines whether the calculated risk of the base trajectory BL-2 is equal to or smaller than the threshold value Th (step S105). When the risk calculator 150 determines that the calculated risk of the base trajectory BL-2 is equal to or smaller than the threshold value Th, the traveling controller 180 causes the mobile object 10 to travel along the base trajectory BL (step S106). On the other hand, when the risk calculator 150 determines that the calculated risk of the base trajectory BL-2 is larger than the threshold value Th, the travelable space detector 160 detects a travelable space FS-2 in the fisheye camera coordinate system on the basis of the peripheral image (step S107). Next, the traveling trajectory calculator 170 calculates the modification amount of each trajectory point that is within the range of the travelable space FS-2 detected by the travelable space detector 160 as the modification amount in the orthogonal coordinate system on the basis of the risk of each trajectory point of the base trajectory BL-2 calculated by the risk calculator 150 (step S108). Next, the traveling trajectory calculator 170 calculates the traveling trajectory TL-1 by modifying the base trajectory BL-1 by the modification amount in the orthogonal coordinate system (step S109). Next, the coordinate convertor 140 coordinate-converts the traveling trajectory TL-1 in the orthogonal coordinate system into the traveling trajectory TL-2 in the fisheye camera coordinate system (step S110). Next, the risk calculator 150 calculates the risk of the traveling trajectory TL-2 on the basis of the peripheral image and the traveling trajectory TL-2 in the fisheye camera coordinate system (step S111).

Next, the risk calculator 150 determines whether the calculated risk of the traveling trajectory TL-2 is equal to or smaller than the threshold value Th (step S112). When the risk calculator 150 determines that the calculated risk of the traveling trajectory TL-2 is equal to or smaller than the threshold value Th, the traveling controller 180 causes the mobile object 10 to travel along the traveling trajectory TL (step S113). On the other hand, when the risk calculator 150 determines that the calculated risk of the traveling trajectory TL-2 is larger than the threshold value Th, it returns the processing to step S109 again and calculates the traveling trajectory TL-1 again.

As described above, according to the embodiment of the present invention, the control device calculates the modification amount of a base trajectory in the orthogonal coordinate system on the basis of the risk of the base trajectory in the fisheye camera coordinate system without coordinate-converting an image captured by the fisheye camera into that in the orthogonal coordinate system, and coordinate-converts a traveling trajectory obtained by modifying the base trajectory in the orthogonal coordinate system by the modification amount into that in the fisheye camera coordinate system again to evaluate the risk of the traveling trajectory in the fisheye camera coordinate system. As a result, it is possible to appropriately evaluate the risk of the traveling trajectory while reducing a processing load.

The embodiment described above can be expressed as follows.

A control device includes a storage device that has stored a program, and a hardware processor, in which the hardware processor executes the program stored in the storage device, thereby acquiring a peripheral image of a mobile object, that is an image captured by a fisheye camera mounted on the mobile object, calculating an instruction regarding a future traveling of the mobile object as a base trajectory in an orthogonal coordinate system, coordinate-converting the acquired base trajectory in the orthogonal coordinate system into a base trajectory in a fisheye camera coordinate system, calculating a risk of the base trajectory in the fisheye camera coordinate system on the basis of the peripheral image and the base trajectory in the fisheye camera coordinate system, and calculating a traveling trajectory by modifying the base trajectory in the orthogonal coordinate system on the basis of the risk of the base trajectory in the fisheye camera coordinate system.

Although a form for implementing the present invention has been described above using the embodiment, the present invention is not limited to the embodiment, and various modifications and substitutions can be made within a range not departing from the gist of the present invention.

What is claimed is:

1. A control device comprising:
a storage device which has stored a program; and
a hardware processor,
wherein the hardware processor executes the program stored in the storage device, thereby
acquiring a peripheral image of a mobile movement mechanism, wherein the peripheral image is an image captured by a fisheye camera mounted on the mobile object,
calculating an instruction regarding future traveling of the mobile object as a base trajectory in an orthogonal coordinate system,
coordinate-converting the calculated base trajectory in the orthogonal coordinate system into a base trajectory in a fisheye camera coordinate system,
calculating a risk of each trajectory point constituting the base trajectory in the fisheye camera coordinate system on the basis of the peripheral image, and the base trajectory in the fisheye camera coordinate system, and calculating, if a sum of risk values of the trajectory points on the base trajectory is equal to or larger than a threshold value, a traveling trajectory in the orthogonal coordinate system by modifying a trajectory point of the base trajectory in the orthogonal coordinate system more as the risk of the trajectory point of the base trajectory in the fisheye camera coordinate system is larger, wherein the hardware processor coordinate-converts the traveling trajectory in the orthogonal coordinate system into a traveling trajectory in the fisheye camera coordinate system for risk calculation, wherein the hardware processor calculates a risk of each trajectory point constituting the traveling trajectory in the fisheye camera coordinate system on the basis of the peripheral image and the traveling trajectory in the fisheye camera coordinate system, wherein the hardware processor recalculates, if a sum of risk values of the trajectory points on the traveling trajectory is equal to or larger than the threshold value, a traveling trajectory in the orthogonal coordinate system by modifying a trajectory point of the traveling trajectory in the orthogonal coordinate system more as the risk of the trajectory point of the traveling trajectory in the fisheye camera coordinate system is larger, wherein the hardware processor coordinate-converts the traveling trajectory recalculated in the orthogonal coordinate system into a traveling trajectory in the fisheye camera coordinate system for risk calculation, and wherein, if the sum of risk values of the trajectory points on the base trajectory or the traveling trajectory is smaller than the threshold value, the hardware processor outputs a command value to the motor, wherein the command value comprises an indication that the mobile object is to travel along the base trajectory or the traveling trajectory, and wherein, based on the command value, the motor facilitates movement of the mobile object based on the motor driving the movement mechanism.

2. The control device according to claim 1,
wherein the hardware processor coordinate converts the traveling trajectory in the orthogonal coordinate system into the traveling trajectory in the fisheye camera coordinate system,
the hardware processor calculates the risk of the traveling trajectory in the fisheye camera coordinate system on the basis of the peripheral image and the traveling trajectory in the fisheye camera coordinate system, and
the hardware processor calculates the traveling trajectory again by modifying the traveling trajectory in the orthogonal coordinate system on the basis of the risk of the traveling trajectory in the fisheye camera coordinate system.

3. The control device according to claim 1,
wherein the hardware processor causes the mobile object to travel along the base trajectory or the traveling trajectory, and
the hardware processor causes the mobile object to travel along the base trajectory or the traveling trajectory when it is determined that the risk of the base trajectory or the traveling trajectory is equal to or less than a threshold value.

4. The control device according to claim 1,
wherein the hardware processor detects a body motion that indicates an instruction regarding future traveling of the mobile object by a user, and
the hardware processor calculates a base trajectory in the orthogonal coordinate system on the basis of a detected body motion.

5. A control method to be executed by a computer mounted on a mobile object, the control method comprising:
acquiring a peripheral image of the mobile object having a motor and a movement mechanism, wherein the peripheral image is an image captured by a fisheye camera mounted on the mobile object;
acquiring an instruction regarding future traveling of the mobile object as a base trajectory in an orthogonal coordinate system;
coordinate-converting the acquired base trajectory in the orthogonal coordinate system into a base trajectory in a fisheye camera coordinate system;
calculating a risk of each trajectory point constituting the base trajectory of the fisheye camera coordinate system on the basis of the peripheral image and the base trajectory in the fisheye camera coordinate system; and
calculating, if a sum of risk values of the trajectory points on the base trajectory is equal to or larger than a threshold value, a traveling trajectory in the orthogonal coordinate system by modifying a trajectory point of the base trajectory in the orthogonal coordinate system more as the risk of the trajectory point of the base trajectory in the fisheye camera coordinate system is larger;
coordinate-converting the traveling trajectory in the orthogonal coordinate system into a traveling trajectory in the fisheye camera coordinate system for risk calculation;
calculating a risk of each trajectory point constituting the traveling trajectory in the fisheye camera coordinate system on the basis of the peripheral image and the traveling trajectory in the fisheye camera coordinate system;
recalculating, if a sum of risk values of the trajectory points on the traveling trajectory is equal to or larger than the threshold value, a traveling trajectory in the orthogonal coordinate system by modifying a trajectory point of the traveling trajectory in the orthogonal coordinate system more as the risk of the trajectory point of the traveling trajectory in the fisheye camera coordinate system is larger;
coordinate-converting the traveling trajectory recalculated in the orthogonal coordinate system into a traveling trajectory in the fisheye camera coordinate system for risk calculation; and
if the sum of risk values of the trajectory points on the base trajectory or the traveling trajectory is smaller than the threshold value, outputting a command value to the motor; and
based on the command value, facilitating, by the motor, a travel of the mobile object along the base trajectory or the traveling trajectory, wherein the facilitating comprises driving, by the motor, the movement mechanism.

6. A computer-readable non-transitory storage medium that has stored a program for causing a computer mounted on a mobile object to execute:
acquiring a peripheral image of the mobile object having a motor and a movement mechanism, wherein the peripheral image is an image captured by a fisheye camera mounted on the mobile object;

acquiring an instruction regarding future traveling of the mobile object as a base trajectory in an orthogonal coordinate system;

coordinate-converting the acquired base trajectory in the orthogonal coordinate system into a base trajectory in a fisheye camera coordinate system;

calculating a risk of each trajectory point constituting the base trajectory of the fisheye camera coordinate system on the basis of the peripheral image and the base trajectory in the fisheye camera coordinate system; and calculating, if a sum of risk values of the trajectory points on the base trajectory is equal to or larger than a threshold value, a traveling trajectory in the orthogonal coordinate system by modifying a trajectory point of the base trajectory in the orthogonal coordinate system more as the risk of the trajectory point of the base trajectory in the fisheye camera coordinate system is larger;

coordinate-converting the traveling trajectory in the orthogonal coordinate system into a traveling trajectory in the fisheye camera coordinate system for risk calculation;

calculating a risk of each trajectory point constituting the traveling trajectory in the fisheye camera coordinate system on the basis of the peripheral image and the traveling trajectory in the fisheye camera coordinate system;

recalculating, if a sum of risk values of the trajectory points on the traveling trajectory is equal to or larger than the threshold value, a traveling trajectory in the orthogonal coordinate system by modifying a trajectory point of the traveling trajectory in the orthogonal coordinate system more as the risk of the trajectory point of the traveling trajectory in the fisheye camera coordinate system is larger;

coordinate-converting the traveling trajectory recalculated in the orthogonal coordinate system into a traveling trajectory in the fisheye camera coordinate system for risk calculation; and if the sum of risk values of the trajectory points on the base trajectory or the traveling trajectory is smaller than the threshold value, outputting a command value to the motor; and based on the command value, facilitating, by the motor, a movement of the mobile object along the base trajectory or the traveling trajectory, wherein the facilitating comprises driving, by the motor, the movement mechanism.

* * * * *